United States Patent
Knoll et al.

(10) Patent No.: US 9,531,276 B2
(45) Date of Patent: Dec. 27, 2016

(54) METHOD FOR CONTROLLING A POWER SOURCE, AND POWER SOURCE AND PROCESS CONTROLLER THEREFOR

(71) Applicant: Fronius International GmbH, Pettenbach (AT)

(72) Inventors: Thomas Knoll, Ried im Traunkreis (AT); Alfred Hiesmayr, Ried im Traunkreis (AT)

(73) Assignee: Fronius International GmbH, Pettenbach (AT)

( * ) Notice: Subject to any disclaimer, the term of this patent is extended or adjusted under 35 U.S.C. 154(b) by 116 days.

(21) Appl. No.: 14/401,614

(22) PCT Filed: May 16, 2013

(86) PCT No.: PCT/AT2013/050109
§ 371 (c)(1),
(2) Date: Nov. 17, 2014

(87) PCT Pub. No.: WO2013/170287
PCT Pub. Date: Nov. 21, 2013

(65) Prior Publication Data
US 2015/0138842 A1 May 21, 2015

(30) Foreign Application Priority Data

May 18, 2012 (AT) .................. A 591/2012

(51) Int. Cl.
*H02M 3/157* (2006.01)
*H02M 3/335* (2006.01)
(Continued)

(52) U.S. Cl.
CPC ........ *H02M 3/33507* (2013.01); *B23K 9/1043* (2013.01); *H02J 7/0052* (2013.01);
(Continued)

(58) Field of Classification Search
CPC ............ H02M 2001/0016; H02M 2001/0019; H02M 2001/0025; H02M 2001/0032; H02M 2001/0067; H02M 2001/007; H02M 1/42; H02M 1/4225; H02M 3/156; H02M 3/157; H02M 3/158; H02M 2001/0012
See application file for complete search history.

(56) References Cited

U.S. PATENT DOCUMENTS 7,888,919 B2 * 2/2011 Dishman ............... H02M 3/156
323/266
7,911,816 B2 * 3/2011 Miramonti ............ H02M 3/156
219/663

(Continued)

FOREIGN PATENT DOCUMENTS

CN  101425756 A  5/2009
EP  0 866 284 A2  9/1998
(Continued)

OTHER PUBLICATIONS

International Search Report of PCT/AT2013/050109, mailed Feb. 5, 2014.

*Primary Examiner* — Gary L Laxton
(74) *Attorney, Agent, or Firm* — Collard & Roe, P.C.

(57) ABSTRACT

A method for controlling a power source is specified. The power source comprises a first converter (1) for converting an input voltage ($U_E$) to an intermediate circuit voltage ($U_{ZK}$, $U_{ZK1}$), an intermediate circuit capacitor (2) and a second converter (3) for converting the intermediate circuit voltage ($U_{ZK}$, $U_{ZK1}$) to an output voltage ($U_A$). A process is being controlled at the output of the second converter (3). A digital process controller predetermines at least one parameter and/or the value thereof to control the intermediate (Continued)

circuit voltage ($U_{ZK}$, $U_{ZK1}$) for the first converter (1) depending on an event at the output.

13 Claims, 7 Drawing Sheets

(51) Int. Cl.
*H02M 7/217* (2006.01)
*B23K 9/10* (2006.01)
*H02J 7/00* (2006.01)
*H02M 3/158* (2006.01)
*H02M 1/00* (2006.01)

(52) U.S. Cl.
CPC ...... *H02M 7/217* (2013.01); *H02M 2001/007* (2013.01); *H02M 2001/0019* (2013.01)

(56) References Cited

U.S. PATENT DOCUMENTS

| | | |
|---|---|---|
| 8,630,105 B2 * | 1/2014 | Uno ................. H02M 1/36 323/299 |
| 2006/0226130 A1 | 10/2006 | Kooken et al. |
| 2008/0232141 A1 | 9/2008 | Artusi et al. |
| 2008/0284388 A1 | 11/2008 | Oettinger et al. |
| 2010/0225289 A1 | 9/2010 | Chang |
| 2011/0309054 A1 | 12/2011 | Salsich |

FOREIGN PATENT DOCUMENTS

| | | |
|---|---|---|
| EP | 1 710 897 A2 | 10/2006 |
| JP | H08-237963 A | 9/1996 |
| JP | H09-37559 A | 2/1997 |
| JP | H10-341572 A | 12/1998 |

\* cited by examiner

METHOD FOR CONTROLLING A POWER SOURCE, AND POWER SOURCE AND PROCESS CONTROLLER THEREFOR

CROSS REFERENCE TO RELATED APPLICATIONS

This application is the National Stage of PCT/AT2013/050109 filed on May 16, 2013, which claims priority under 35 U.S.C. §119 of Austrian Application No. A 591/2012 filed on May 18, 2012, the disclosure of which is incorporated by reference. The international application under PCT article 21(2) was not published in English.

BACKGROUND OF THE INVENTION.

1. Field of the invention

The invention relates to a method for controlling a power source comprising a first converter for converting an input voltage to an intermediate circuit voltage, an intermediate circuit capacitor and a second converter for converting the intermediate circuit voltage to an output voltage, whereby a process is controlled at the output of the second converter and in particular the output voltage and/or output current is controlled with the aid of the second converter.

The invention further relates to a process controller for a power source, which power source comprises a first converter for converting an input voltage to an intermediate circuit voltage, an intermediate circuit capacitor and a second converter for converting the intermediate circuit voltage to an output voltage. The controller comprises an input for the output voltage and/or output current, an output for activating the second converter and means for running a control algorithm, and the output voltage and/or output current is provided as a controlled variable and the second converter is provided as an actuator of a closed loop.

Finally, the invention relates to a power source, comprising a first converter for converting an input voltage to an intermediate circuit voltage, an intermediate circuit capacitor and a second converter for converting the intermediate circuit voltage to an output voltage and a controller of said type, the input of which for the output voltage and/or output current is connected to the output of the welding power source and the output of which is connected to the second converter for activating the second converter.

2. Description of the Related Art

Methods of controlling a power source of the type outlined above are known in principle. They are used to convert an input alternating voltage to an intermediate circuit voltage. Alternatively, another option is to convert an input direct voltage to an intermediate circuit voltage if the input direct voltage is not at the desired level. This intermediate circuit voltage is kept at a more or less constant level by means of an intermediate circuit capacitor. As a result, this intermediate circuit voltage is converted to an output voltage. The output voltage and/or output current are controlled by means of the second converter. For example, a pulse-shaped output current at constant voltage can be provided, such as needed for impulse welding, for example. Such methods are also used for charging batteries.

In this context, US 2010/225289 A1 discloses a two-stage voltage supply with a measuring circuit at its output and a controller connected to it, which activates the two switching stages of the voltage supply.

EP 0 866 284 A2 discloses an air conditioning system also having a two-stage voltage supply for the compressor. In an arrangement similar to that of US 2010/225289 A1, said voltage supply comprises a measuring circuit at its output and a controller connected to it, which activates the two switching stages of the voltage supply.

US 2011/309054 A1 also discloses a two-stage welding power source with a measuring circuit at the output and a process controller connected to it, which activates the first of the two switching stages.

US 2008/284388 A1 and JP 10 341572 A disclose other two-stage voltage supplies. These respectively comprise a measuring circuit at the output and on the intermediate circuit, which are connected to a controller, which activates the two switching stages of the voltage supply.

SUMMARY OF THE INVENTION

Another aspect is the fact that a transformation ratio of a transformer provided in the second converter due to galvanic isolation and current transformation for example, has to be set as high as possible as a rule so that the primary currents are relatively low. This requires a relatively high intermediate circuit voltage and hence relatively large air and current leakage paths, especially for primary—secondary isolating components. However, a high transformation ratio of said transformer is often limited due to the fact that the requisite and industrially available components have a specific pin spacing, but one which is too small for the above-mentioned air and current leakage paths. However, a smaller intermediate circuit voltage provided for this reason in turn makes high primary currents and the use of expensive components necessary, in particular expensive semiconductors in rectifiers and rectified inverters of said power source. As may be seen, this is an unsatisfactory state of affairs because the capacity of a power source is unnecessarily restricted by these external peripheral conditions.

Accordingly, the objective of the invention is to propose an improved method of controlling a power source in the context of a welding process or a battery charging process, an improved process controller for a power source and an improved power source. In particular, the welding quality or quality obtained when charging a battery should be improved for a same power section.

The objective is achieved by the invention on the basis of a method of the type outlined above, whereby at least one parameter and/or its value is predefined by a digital process controller in order to control the intermediate circuit voltage for the first converter depending on an event at the output.

The objective is also achieved by the invention by means of a process controller of the type outlined above, comprising an output which is provided with a view to influencing the intermediate circuit voltage depending on a welding process or a battery charging process.

Finally, the objective of the invention is achieved by a power source of the type outlined above, in which the output of the controller is connected to the first converter or to another controller connected to the first converter in order to influence the intermediate circuit voltage.

As proposed by the invention, therefore, the intermediate circuit voltage can be adapted to a welding process or a battery charging process, in other words varied, i.e. in response to a briefly occurring state at the output, the intermediate circuit voltage is adapted so that there is always sufficient power available and disruption to the intermediate circuit voltage is prevented. As a result of this intervention at the first converter, said processes can be significantly improved. Of particular advantage in this respect is the fact that the power section as such, i.e. the two converters, can remain effectively unchanged. The increase in quality is achieved due to the fact that the latter are activated in a new way. The invention can therefore be implemented with very little in the way of technical complexity. Furthermore, it is also possible to retrofit existing power sections in a simple manner.

Another aspect is the fact that varying the intermediate circuit voltage in the means results in an intermediate circuit voltage which is lower than its maximum value. However, air and current leakage paths are not usually designed for the maximum value of the intermediate circuit voltage but rather its mean value. Furthermore, some components are resistant to brief voltage spikes or excessive voltage. This being the case, it is possible to build power sources without the disadvantages described above. In particular, the transformation ratio of a transformer provided in the second converter, for example, can be set high, which leads to relatively low primary currents. With a higher capacity of the power source, therefore, it is possible to use components with a relatively small pin spacing or relatively low voltage resistance on the one hand but also components with a relatively low current-carrying capacity on the other hand. This seemingly paradoxical situation is a result of the lower value of a varying intermediate circuit voltage in the means.

Furthermore, the new type of controller structure results in a scaling advantage in terms of the design of the first converter. During this short period only, the brief rise in the intermediate circuit voltage gives an output characteristic which permits high output powers. In practice, in static power source operation, this range of the output characteristic is virtually never used or the power source should not actually be designed for permanent operation in this range.

The intermediate circuit voltage reduced for a longer period limits the possible output power of the power source. For example, 500 A output current at a 1:10 transformer corresponds to 50 A primary current. If 700Vdc are available at the intermediate circuit, 700Vdc×50=35 kW can theoretically be output at the output. If the intermediate circuit voltage is reduced to 650V for example, a power of only 32.5 kW can then be output.

Most components are capable of briefly carrying higher powers. This being the case, an inductance of the converter can be dimensioned to a considerably lower level.

The invention may therefore be seen as being the recognition that varying an intermediate circuit voltage brings advantages even though, traditionally, the intermediate circuit voltage should be kept as constant as possible, i.e. the aim is to obtain a direct voltage in the intermediate circuit. In spite of diverging from this principle, the voltage in the intermediate circuit can naturally be kept at least temporarily constant.

Advantageous embodiments and additional features of the invention may be found in the dependent claims and the description of the appended drawings.

It is of advantage if the set value is predefined at a calculated instant prior to the event and the intermediate circuit voltage is adapted up to that instant. This ensures that sufficient power is available at the onset of the event and the intermediate circuit voltage is interrupted only slightly or not at all.

It is of advantage if the intermediate circuit voltage is controlled with the aid of the first converter and a set value of the intermediate circuit voltage is predefined as a function of a future output voltage and/or a future output current. Based on this variant, the intermediate circuit voltage keeps particularly well—unlike when it is being controlled—to a set value predefined as a function of the output voltage and/or output current. The process controller also "looks" into the future, so to speak, and prepares the voltage in the intermediate circuit capacitor for future requirements. For example, in impulse welding, the process controller "knows" when the next impulse should be applied and can therefore react accordingly on a precautionary basis by raising the intermediate circuit voltage in order to obtain an ideal impulse shape as far as possible. The process controller may access a process data base in order to obtain the relevant information ("preselected control signal from process data base"). Naturally, in order to influence the intermediate circuit voltage directly, it would also be possible to adapt the manipulated variable of the controller directly to processes in order to bring about a rapid increase in the intermediate circuit voltage.

In this connection, it is of particular advantage if an output current is impulse-shaped (in particular with a direct component) and the intermediate circuit voltage is increased prior to an impulse. This enables the slope of the current increase to be made bigger so that the impulse is better adapted to an ideal shape. In this connection, it is of particular advantage if the intermediate circuit voltage is increased with such timing prior to an impulse (preferably 0 ms to 5 ms prior to the pulse) that it reaches its maximum value at the start of the current impulse, thereby also enabling a maximum current increase to be obtained.

It is of particular advantage if the intermediate circuit voltage is reduced when the impulse-shaped output current has reached its upper set value. As a result, the intermediate circuit voltage is reduced again immediately the increase has served its purpose. In this manner, the mean value of the intermediate circuit voltage can be sharply reduced. This enables the use of lower-rated components, thereby significantly reducing manufacturing costs.

It is of advantage if the intermediate circuit voltage is increased more sharply in the case of a shorter impulse than in the case of a longer impulse. This enables optimum use to be made of the effect of increasing the intermediate circuit voltage whilst keeping it at a constant mean value. For example, the intermediate circuit voltage can be increased by twice the amount for a pulse duration ratio of 30% than for a pulse duration ratio of 60%.

It is also of advantage if intervention with respect to the set value of the intermediate circuit voltage or directly with respect to the manipulated variable of the controller of the first converter is timed in such a way prior to an impulse that the intermediate circuit voltage is not interrupted to such a great degree or is not interrupted at all. The intermediate circuit voltage can therefore be kept much more constant than would be possible using only the control parameters because here too, a response can be obtained even before the occurrence of an event in the process. This principle also applies in the same way in the case of a pulse end for example, whereby overshooting of the intermediate circuit voltage can be reduced or prevented already before or exactly at the pulse end.

It is of also advantage, particularly in the case of a welding power source, if, on detection of a start-up operation, the intermediate circuit voltage is increased for a sufficiently long time before the output current starts to flow. This means that more output power is available at the start of the process and the rise in output current is accelerated.

It is of also advantage if the intermediate circuit voltage is reduced when the power source is running without load. This variant offers advantages because some welding power sources or battery charging devices are run with no load for a large part of their service life. This reduces the permanent component load on some components (e.g. intermediate circuit capacitors) and increases their service life.

It is also of advantage, especially in the case of a battery charging device, if the intermediate circuit voltage is increased or reduced as a function of the output voltage level during a process which requires a variable output voltage depending on the process. The second converter can be permanently operated at an optimum operating point as a result, e.g. switching losses in this converter can be reduced as far as possible across the entire output voltage range.

It is expedient if the first converter comprises a passive rectifier and a voltage regulator connected to it. This enables the intermediate circuit voltage to be efficiently set. Furthermore, passive rectifiers and voltage regulators constitute tried and tested means, as a result of which the invention can be practically implemented with relatively little in the way of technical complexity whilst being reliable at the same time.

It is also expedient if the first converter comprises a controlled rectifier. This is another tried and tested means of adjusting an intermediate circuit voltage.

It is also expedient if the second converter comprises an inverted rectifier, a transformer connected to it and a rectifier connected to the latter. This enables the intermediate circuit voltage to be efficiently converted to a desired output voltage. Inverted rectifiers, trans-formers and rectifiers also constitute tried and tested means, as a result of which the invention can be practically implemented with relatively little in the way of technical complexity whilst being reliable at the same time.

Finally, it is of advantage if the power or voltage source is designed as a welding power source or battery charging device. Both of these devices frequently require impulse-shaped current flows, which can be obtained particularly efficiently with the aid of the invention.

BRIEF DESCRIPTION OF THE DRAWING

To provide a clearer understanding, the invention will be described in more derail below with reference to the appended drawings.

These are highly simplified, schematic diagrams illustrating the following.

DETAILED DESCRIPTION OF PREFERRED EMBODMENTS

Figure 1:
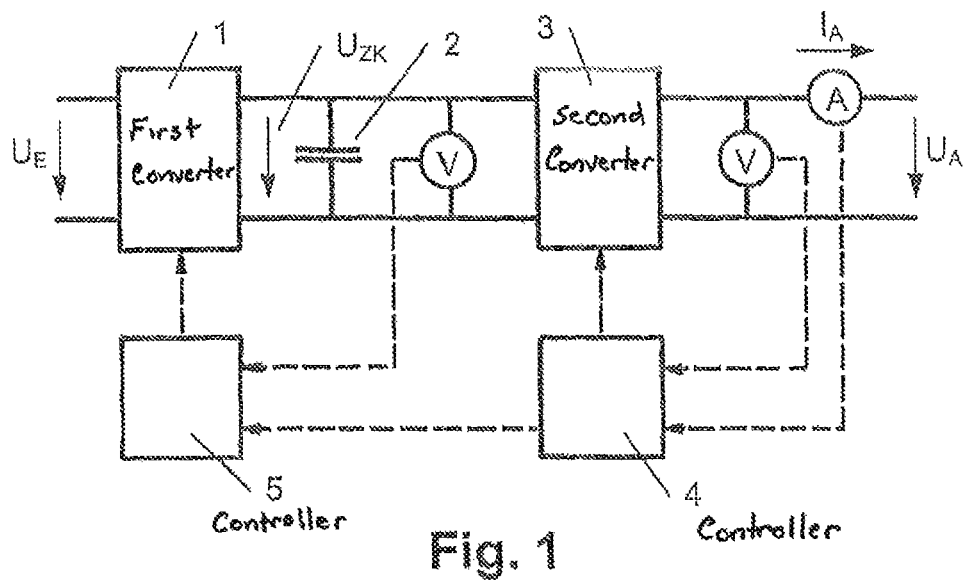
FIG. 1 a first schematically illustrated variant of a power source with two separate control loops for the intermediate circuit voltage and output voltage respectively output current.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a power source, comprising a first converter 1 for converting an input voltage $U_E$ to an intermediate circuit voltage $U_{ZK}$, an intermediate circuit capacitor 2 and a second converter 3 for converting the intermediate circuit voltage $U_{ZK}$ to an output voltage $U_A$. FIG. 1 also illustrates a controller 4, comprising two inputs for the output voltage $U_A$ and output current $I_A$, an output for activating the second converter 3 and means for running a control algorithm, where the output voltage $U_A$ and output current $I_A$ are provided as a controlled variable and the second converter 3 is provided as the actuator of a closed loop. It would also be conceivable for the controller 4 to comprise only one input for the output voltage $U_A$ or output current $I_A$, in which case the control algorithm is set up accordingly for the controller of the output voltage $U_A$ or output current $I_A$. The controller 4 also has an output, which is provided as a means of influencing the intermediate circuit voltage $U_{ZK}$ with the aid of the first converter 1 depending on a welding process or battery charging process. Specifically, the controller 4 transmits a set value for the intermediate circuit voltage $U_{ZK}$ to the controller 5, which in turn controls the intermediate circuit voltage $U_{ZK}$ with the aid of the first converter 1.

In this particular case, voltage measuring devices V are provided for measuring the intermediate circuit voltage $U_{ZK}$ and output voltage $U_A$, which may be of any design. For example, analog-to-digital converters may be provided for this purpose, which transmit the measured voltage value digitally to the controller 4, 5. A controller 4, 5 is often also provided in the form of a microcontroller, which usually has inputs for measuring voltage as standard.

A current measuring device A is also provided as a means of measuring the output current $I_A$, which likewise may be of any design. The current may be measured for example with the aid of a voltage measurement on a shunt. The voltage as such may be measured in the manner described above.

Generally speaking, the controllers 4 and 5 may be digital processors. They may be set up on the basis of hardware or software. If the controllers 4 and/or 5 are set up on the basis of software, the program steps will run the control algorithm during the running time of the program. In order to store the program, the microcontroller may also have an integrated memory. The two controllers 4 and 5 may naturally also be integrated in one and the same circuit, in one and the same microcontroller and in one and the same program. This being the case, the illustrated boundary line of the controller blocks 4 and 5 should be understood as being functional rather than physical.

In this particular example, the intermediate circuit voltage $U_{ZK}$ and the output voltage $U_A$ and/or output current $I_A$ are controlled in separate control loops. The controller 4 merely forwards a set value for the intermediate circuit voltage $U_{ZK}$ to the controller 5. However, this is not necessarily the case, as illustrated in FIG. 2.

Figure 2:
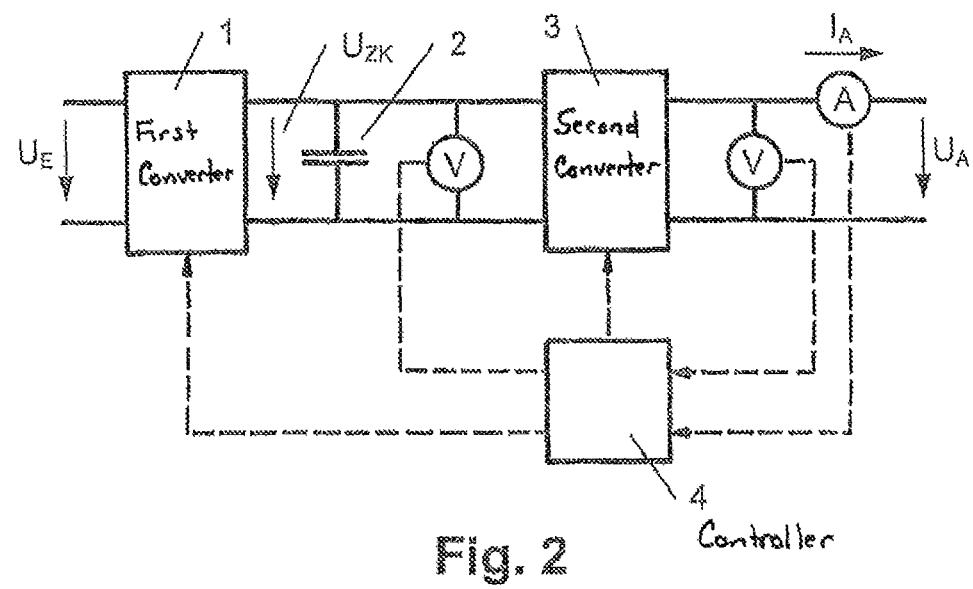
FIG. 2 a second schematically illustrated variant of a power source with one common control loop for the intermediate circuit voltage and output voltage respectively output current.

FIG. 2 illustrates an arrangement which is very similar to the arrangement illustrated in FIG. 1. The difference is that the digital process controller contains only one controller 4, which controls both the intermediate circuit voltage $U_{ZK}$ and the output voltage $U_A$ respectively output current $I_A$. Corresponding multi-dimensional controllers may be used for this purpose.

Figure 3:
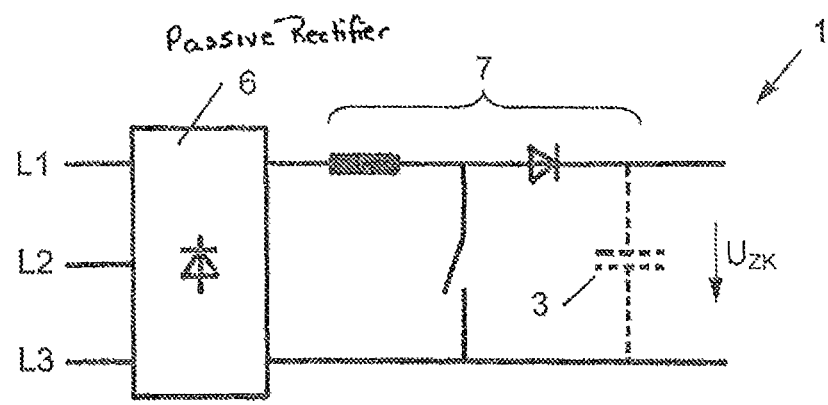
FIG. 3 an example of the first converter with a passive rectifier and a voltage regulator connected to it.

FIG. 3 illustrates a specific embodiment of the first converter 1, which comprises a passive rectifier 6 and a voltage regulator 7 connected to it. The rectifier 6 is supplied via a three-phase connector L1 . . . L3 from which it generates a direct voltage, which is set high by the voltage regulator 7. In principle, however, it would be possible to use a voltage regulator 7 which sets the voltage low. The capacitor 3 in this instance is indicated by broken lines because in FIGS. 1 and 2 it does not actually comprise the first converter 1, but is illustrated here because it is of advantage in providing an understanding of the voltage regulator 7.

Figure 4:
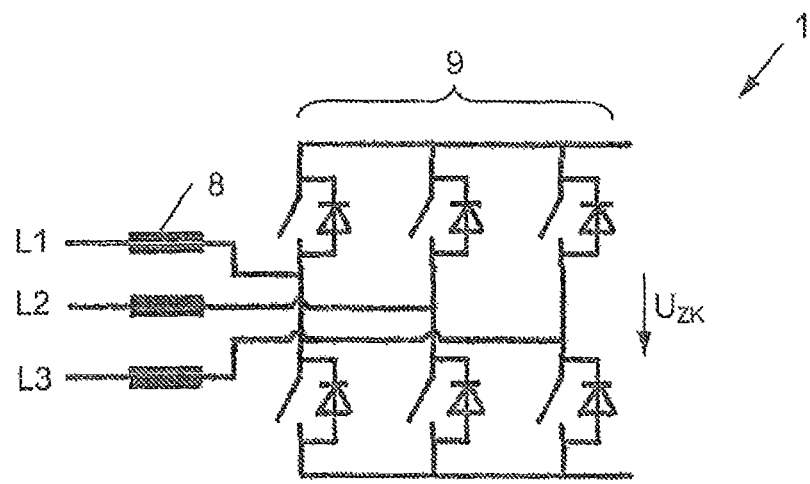
FIG. 4 another example of the first converter with a controlled rectifier.

FIG. 4 illustrates another embodiment of the first converter 1, which comprises a controlled rectifier 9. In this variant, the switches 9 of the rectifiers, which may be provided in the form of IGBTs (Insulated Gate Bipolar Transistor) or MOSFETs (Metal Oxide Semiconductor Field Effect Transistor) for example, are activated so that the voltage is rectified on the one hand but can also be adjusted in terms of level because of the inductances 8 and the intermediate circuit capacitor 3. The inductances may be incorporated in the first converter 1 but may also be part of the power network to which the power source is connected.

Figure 5:
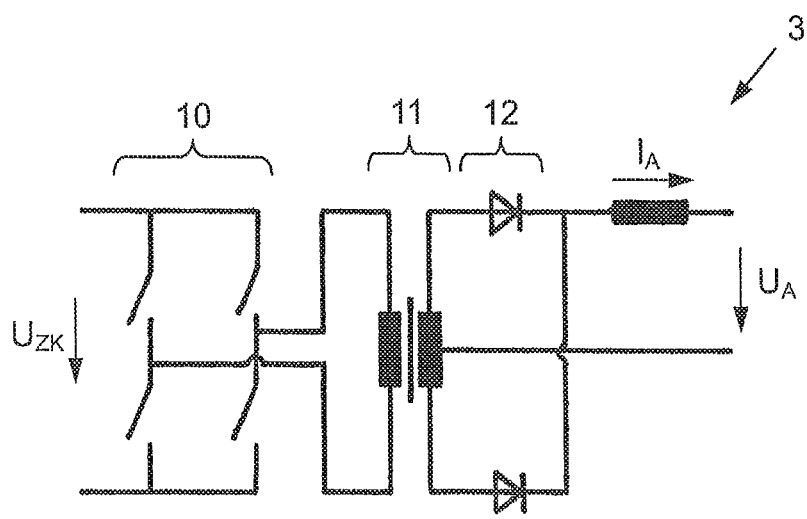
FIG. 5 an example of the second converter with an inverted rectifier, a transformer and a rectifier.

FIG. 5 illustrates an embodiment of the second converter 3, which comprises an inverted rectifier 10, a transformer 11 connected to it and a rectifier 12 connected to the latter. The intermediate circuit voltage $U_{ZK}$ can thus be converted to an output voltage $U_A$, and the output is galvanically isolated from the intermediate circuit. Although not illustrated in detail, the inductance at the output may be part of the second converter 3 but also part of the supplied device (not illustrated) connected to the second converter 3.

Figure 6:
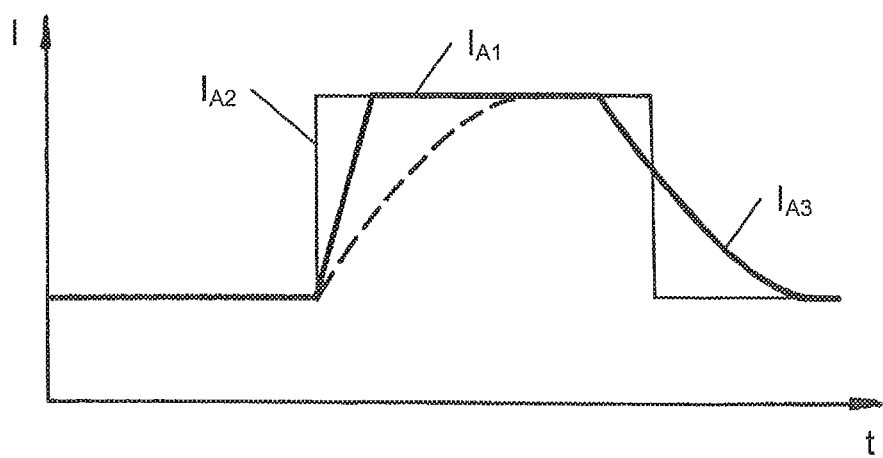
FIG. 6 an exemplary graph plotting current-time of several pulse-shaped curves of the output current.

FIG. 6 is a current-time graph I over t. An impulse-shaped curve of the current I (in this instance having a direct component) illustrates the effects of influencing the intermediate circuit voltage $U_{ZK}$. Increasing the intermediate circuit voltage $U_{ZK}$ results in a better approximation of the current curve $I_{A1}$ (shown by a bold line) with the ideal impulse-shaped curve $I_{A2}$ (shown by a thin line). The ideal impulse shape $I_{A2}$ can therefore be better approximated in this manner than by a current curve $I_{A3}$ (broken line) without increasing the intermediate circuit voltage $U_{ZK}$. Above all, the upper value of the current impulse in curve $I_{A1}$ is achieved more quickly than in curve $I_{A3}$.

Building on this, the process controller 4, 5 is now able to react accordingly prior to a forthcoming event because the instant of immediately forthcoming events, such as a start-up operation, welding impulse start, welding impulse end, short-circuit event, etc., is known to the process controller 4, 5. This being the case, if an increased output current $I_A$ is necessary for the forthcoming event, the process controller 4, 5 increases the requisite parameter or its value (for example the set value for the intermediate circuit voltage $U_{ZK}$) accordingly in good time—essentially in accordance with the current curve $I_{A1}$—before the event so that when the event occurs, the requisite output current $I_A$ is available, in other words sufficient power is stored in the intermediate circuit. This is then achieved with a rapid current increase which is in turn guaranteed by the intervention of the process controller 4, 5 prior to the event.

In principle, the change or control or monitoring of the intermediate circuit voltage $U_{ZK}$ takes place in the independent control loop of the converter 1. For forthcoming changes, however, a change to a parameter for converter 1 is predefined by the controller 4 (process controller) because the controller 5 has no knowledge about the events at the output of the power source, which is why controller 4 intervenes. For example, the defined parameter might be the intermediate circuit voltage $U_{ZK}$ or its set value, a switching time of the converter 1, a pulse width, a peak current for the at least one switch of the converter 1 and/or similar parameters. As a result, the intermediate circuit voltage $U_{ZK}$ is changed very rapidly and effectively because these parameters have a direct influence on the intermediate circuit voltage $U_{ZK}$. In other words, by selecting the parameters to be predefined and varied, the timing for the controller is reduced to a minimum because no intermediate steps are needed for the controller.

Accordingly, at the instant of the event, the intermediate circuit voltage $U_{ZK}$ is increased or adapted at the correct time so that a rapid current increase is possible on the output side without the intermediate circuit voltage $U_{ZK}$ essentially dropping below the set threshold value, i.e. increasing the intermediate circuit voltage $U_{ZK}$ when supplying a high output power prevents a drop below a defined threshold value. Due to the event, the intermediate circuit is subjected to a corresponding load and the intermediate circuit voltage $U_{ZK}$ therefore essentially drops again, and the increase always takes place in such a way that in spite of this drop, the intermediate circuit voltage $U_{ZK}$ does not fall below a defined threshold value. The components are also dimensioned to withstand this threshold value and the brief changes essentially have no effect on the mean value of the intermediate circuit voltage $U_{ZK}$ and the components are therefore not placed under excessive load.

Figure 8:
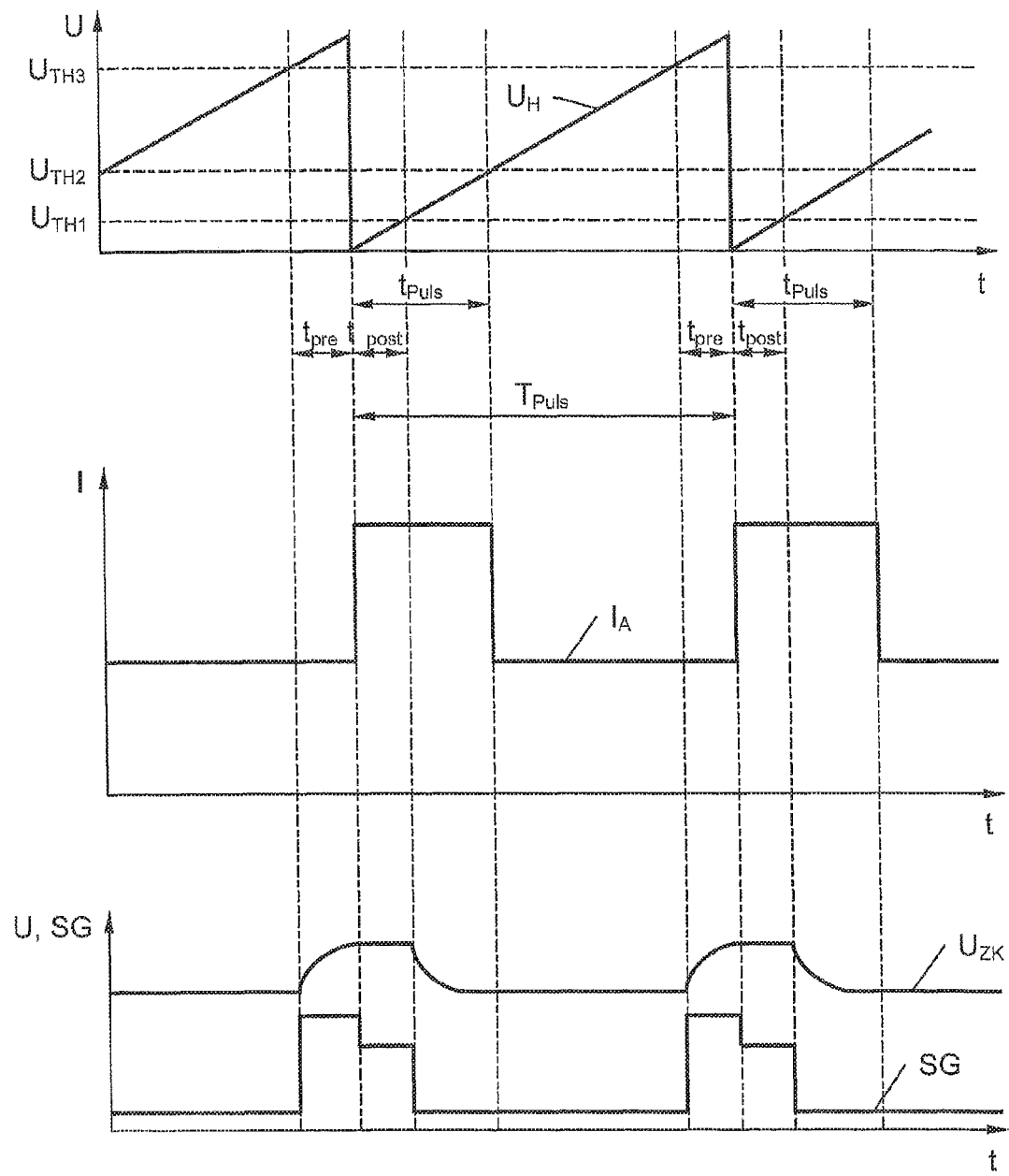
FIG. 8 an example of how the described controller is activated with the aid of a sawtooth auxiliary voltage.
Figure 9:
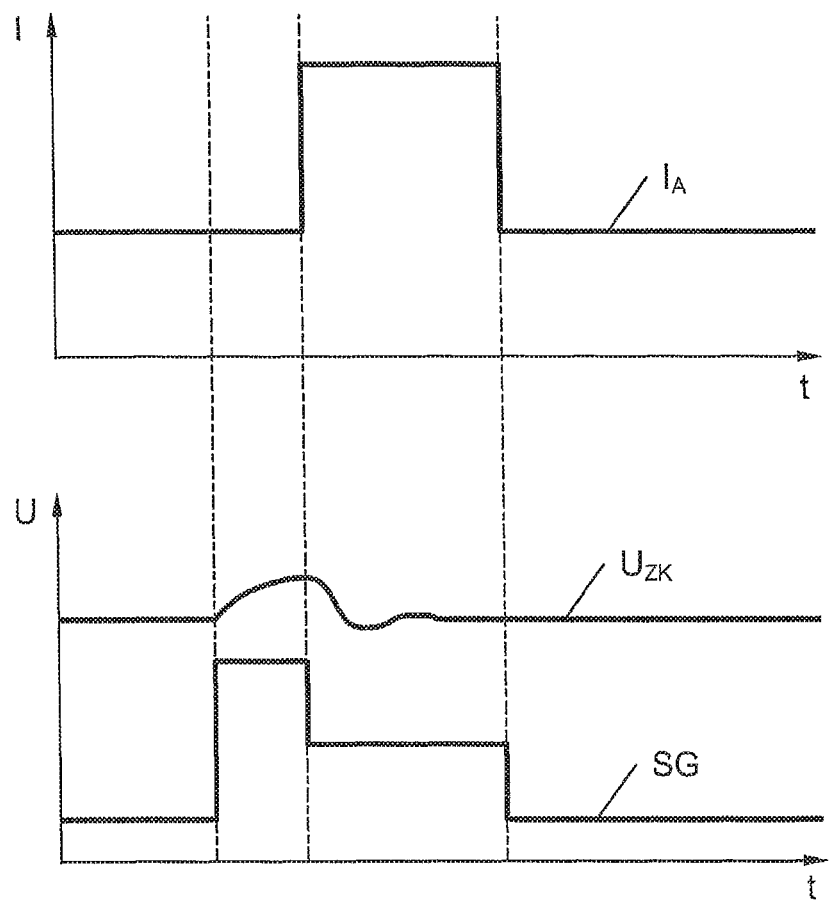
FIG. 9 the timing curve of the intermediate circuit voltage, which remains essentially constant in spite of the current impulse at the output.
Figure 10:
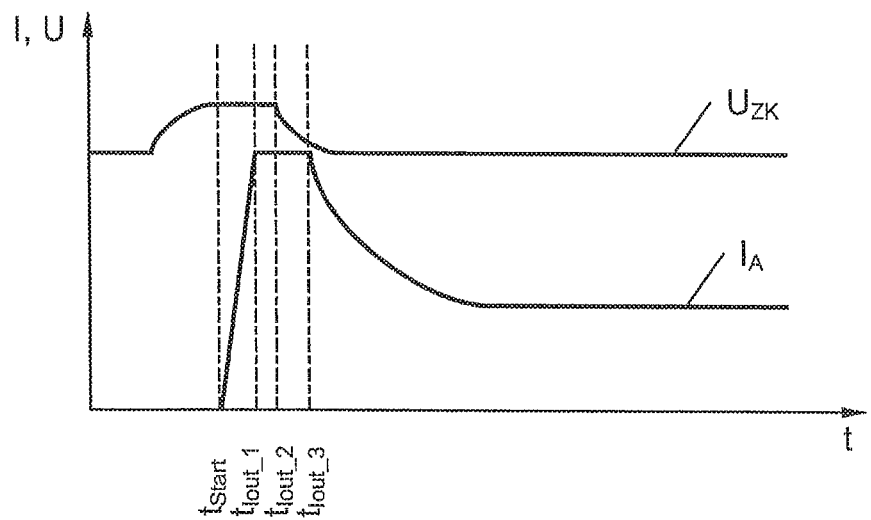
FIG. 10 the curve plotting the intermediate circuit voltage and output current during a welding start-up operation and FIG. 11 the curve plotting selected characteristics during a battery charging operation.

The instants and durations prior to the event may be seen in FIGS. 8, 9 and 10. These are a current impulse, overshoot behavior and a start-up operation during welding.

The set value is preferably adapted up to 10 ms before the occurrence of the event. The time up to the instant is calculated or determined by the process controller 4, 5 accordingly. The time essentially depends on the time needed for the capacitor 2 to charge the intermediate circuit. This is achieved, for example, by accessing a data base in which the times needed for each event depending on output voltage $U_A$ and output current $I_A$ are stored or by a direct calculation prior to each event.

During a welding process or a battery charging process, the output current $I_A$ is controlled in accordance with a pre-set characteristic curve. Such a characteristic curve is determined on the basis of a plurality of parameters which are continuously monitored and controlled during the process. On the basis of these parameters, the process controller 4, 5 sets the instant of the forthcoming event accordingly.

Figure 7:
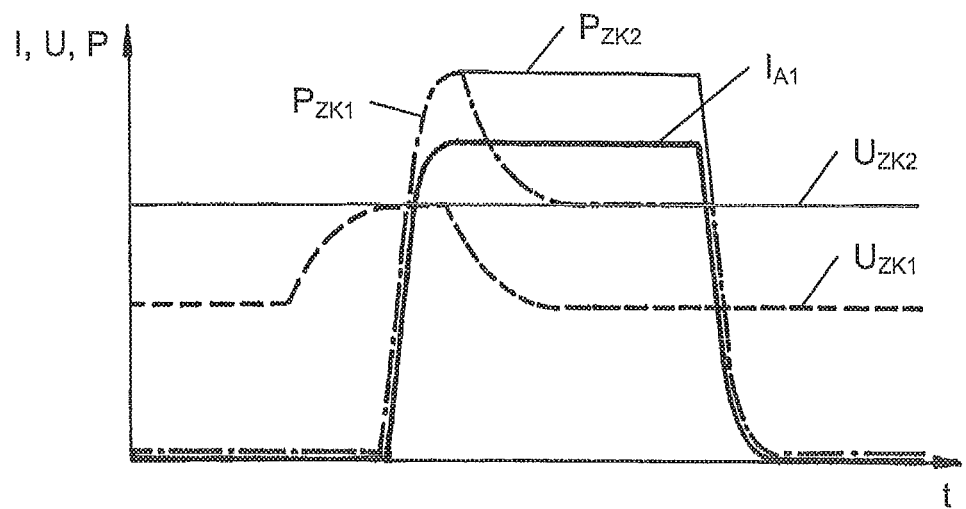
FIG. 7 an exemplary combined graph plotting the time curves of output current, intermediate circuit voltage and intermediate circuit power.

FIG. 7 is a combined graph plotting current I over time t, voltage U over time t and power P over time t. Based on an impulse-shaped curve of the current $I_{A1}$ (in this instance without a direct component) this demonstrates how the intermediate circuit voltage $U_{ZK}$ is influenced. Specifically, the intermediate circuit voltage $U_{ZK1}$ (broken lines) is increased before the current impulse $I_{A1}$. In this example, this is timed so that the intermediate circuit voltage $U_{ZK1}$ has reached its upper set value at the start of the impulse. Accordingly, the current increase can be noticeably increased compared with an impulse without increasing the intermediate circuit voltage $U_{ZK1}$. In this manner, the process controller is able to take account of future events in a welding process or battery charging process. Once the current impulse $I_{A1}$ has reached its upper set value, the intermediate circuit voltage $U_{ZK1}$ is reduced back to its original level. The intermediate circuit voltage $U_{ZK1}$ therefore has the same effect on the current increase as an intermediate circuit voltage $U_{ZK2}$ (thin line) which is constantly kept at a high level but has a lower mean value than the latter. FIG. 7 additionally shows the curve plotting power $P_{ZK1}$ (dotted-dashed line) relative to the intermediate circuit voltage $U_{ZK1}$ as well as the curve plotting power $P_{ZK2}$ (thin line) relative to the intermediate circuit voltage $U_{ZK2}$.

Impulse-shaped current curves are needed during impulse welding or battery charging in particular, for which reason it is of particular advantage if the power source is a welding power source or battery charging device. Due to the lower intermediate circuit voltage $U_{ZK1}$ in the means, current leakage paths can be made shorter than is the case if the intermediate circuit voltage $U_{ZK2}$ is constantly high. This enables the use of components with a relatively small pin spacing and lower voltage resistance which are more readily available and less expensive as a rule.

Furthermore, many components are capable of briefly withstanding higher power losses than during permanent operation. As may be seen from FIG. 7, with an intermediate circuit voltage $U_{ZK2}$, it is permanently possible to draw a power $P_{ZK2}$ from the power source. An intermediate circuit voltage $U_{ZK1}$ dynamically enables a power source behavior to be obtained that is the same as that of a power source with $U_{ZK2}$ but components can advantageously be dimensioned for static operation. For example, inductances of the converter 1 can be reduced to the equivalent of the cross-sections of the winding.

In connection with the curves illustrated in FIGS. 6 and 7, it is of advantage if the intermediate circuit voltage $U_{ZK1}$ is increased more sharply in the case of a shorter impulse than is the case with a longer impulse. This makes optimum use of the effect of increasing the intermediate circuit voltage $U_{ZK1}$ whilst maintaining its mean value constant. For example, the intermediate circuit voltage can be increased twice as high for a pulse duration ratio of 30% as a pulse duration ratio of 60%. This approach is particularly expedient if the intermediate circuit voltage $U_{ZK1}$ is not reduced immediately as illustrated in FIG. 7 when the current impulse $I_{A1}$ has reached its upper set value but rather is not reduced until the end of the current impulse $I_{A1}$.

In addition, it is possible to adapt the intermediate circuit voltage $U_{ZK1}$ to a varying output current $I_A$, $I_{A1}$ and a simultaneously varying output voltage $U_A$. In particular, the output current $I_A$, $I_{A1}$ and output voltage $U_A$ may be impulse-shaped. FIGS. 8 to 11 show other illustrative examples of this.

FIG. 8 illustrates an example of how the proposed controller 4, 5 can be specifically activated. The diagrams illustrate a sawtooth auxiliary voltage $U_H$, the output current $I_A$, the intermediate circuit voltage $U_{ZK}$ as well as a manipulated variable SG of the process controller 4, 5. By means of the auxiliary voltage $U_H$ and various voltage threshold values $U_{TH1} \ldots U_{TH3}$, a time sequence can be set in a simple manner for the output current $I_A$, intermediate circuit voltage $U_{ZK}$ and manipulated variable SG of the process controller 4, 5. For example, this may be done with the aid of comparators, to the first input of which the relevant threshold value $U_{TH1} \ldots U_{TH3}$ is applied and to the second input of which the auxiliary voltage $U_H$ is applied. The relevant instants may naturally also be generated by other means, for example with the aid of digital timers.

The impulse of the output currents $I_A$ starts after the falling edge of the auxiliary voltage $U_H$, in the example illustrated, the length $t_{Puls}$ of which can be set with the aid of the third threshold value $U_{TH3}$. With the aid of the first threshold value $U_{TH1}$, the time $t_{pre}$ during which the intermediate circuit voltage $U_{ZK}$ is increased prior to the start of the current impulse can be set. The time $t_{pre}$ is advantageously within the range of 0 ms to 5 ms. With the aid of the second threshold value $U_{TH2}$, the time $t_{post}$ after which the process controller 4, 5 switches from the "increase intermediate circuit voltage" state back to normal operation can be set. FIG. 8 also illustrates how the manipulated variable SG is also reverted slightly at the start of the pulse so that there is no overshooting of the impulse.

FIG. 9 shows a time curve of the output current $I_A$, intermediate circuit voltage $U_{ZK}$ and manipulated variable SG. In this example, the timing with which the set value of the intermediate circuit voltage $U_{ZK}$ or directly the manipulated variable SG of the controller 4, 5 of the first converter 1 is acted on prior to an impulse is such that the intermediate circuit voltage $U_{ZK}$ is reduced not as sharply or not at all. By providing an appropriate time $t_{pre}$, the intermediate circuit voltage $U_{ZK}$ can therefore be kept significantly more constant than would be possible without this "forward-looking" approach. As may also be clearly seen from FIG. 9, the intermediate circuit voltage $U_{ZK}$ overshoots only slightly.

Similar considerations naturally also apply in the case of a pulse end. By appropriately reverting the manipulated variable SG early, an overshoot of the intermediate circuit voltage $U_{ZK}$ can be reduced or even prevented, so that it can remain (virtually) constant. In the example illustrated in FIG. 9, the manipulated variable SG is reverted at the pulse end but it would also be possible for it to be reverted slightly before the pulse end.

FIG. 10 is a graph plotting the intermediate circuit voltage $U_{ZK}$ and output current $I_A$ during a start-up operation of a welding process. The intermediate circuit voltage $U_{ZK}$ can advantageously also be increased in such a situation before the output current $I_A$, which in this instance starts to flow at the instant $t_{Start}$. As may be seen from FIG. 10, the output current $I_A$ rises very rapidly at the instant $t_{Iout\_1}$. At the instant $t_{Iout\_2}$, the intermediate circuit voltage $U_{ZK}$ is reverted again and with effect from the instant $t_{Iout\_3}$ the output current $I_A$ drops to a (quasi) stationary value. Due to the described approach, more output power is available at the start of the process and the steepness of the rise of the output current $I_A$ increases significantly.

Figure 11:
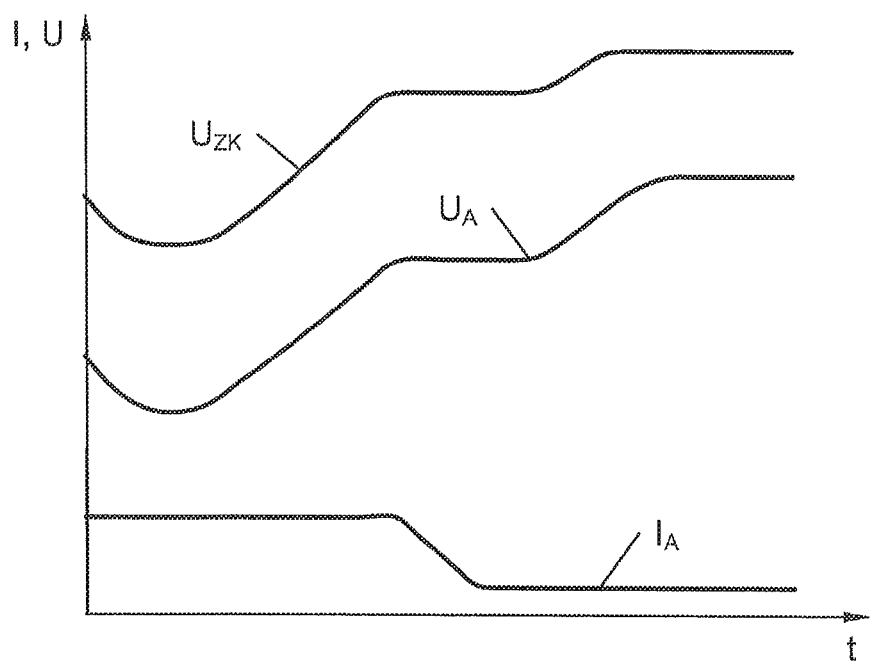

FIG. 11, finally, illustrates an example of a time curve of the output current $I_A$, output voltage $U_A$ and intermediate circuit voltage $U_{ZK}$ during the operation of charging a battery. In this instance, the intermediate circuit voltage $U_{ZK}$—as may be seen from FIG. 11—advantageously changes as a function of the output voltage UA. As a result, the second converter 3 can be operated at an optimum operating point during a battery charging operation and any other processes which require a variable output voltage depending on the process. For example, switching losses in the second converter 3 are kept low across the entire output voltage range.

The embodiments illustrated as examples represent possible variants of the controller 4, 5 (of a process controller) and a power source proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the controller 4, 5 and power source, they and their constituent parts are illustrated schematically in the drawings and in reality, therefore, there may be more components than illustrated or fewer components than illustrated or also different components.

The objective underlying the independent inventive solutions may be found in the description.

| List of reference numbers | |
|---|---|
| 1 | First converter |
| 2 | Intermediate circuit capacitor |
| 3 | Second converter |
| 4 | Controller |
| 5 | Controller |
| 6 | Passive rectifier |
| 7 | Voltage regulator |
| 8 | Inductance |
| 9 | Active rectifier |
| 10 | Inverted rectifier |
| 11 | Transformer |
| 12 | Rectifier |
| I | Current |
| $I_A$ | Output current |
| P | Power |
| $P_{ZK}$ | Intermediate circuit power |
| SG | Manipulated variable |
| t | Time |
| $t_{Puls}$ | Pulse duration |
| $T_{Puls}$ | Pulse period duration |
| $t_{pre}$ | Advance time |
| $t_{post}$ | Follow-up time |
| $t_{Start}$ | Pulse start time |
| $t_{Iout\_1}$ | Instant increase end |
| $t_{Iout\_2}$ | Instant $U_{ZK}$ drop |
| $t_{Iout\_3}$ | Instant $I_A$ drop |
| U | Voltage |
| $U_A$ | Output voltage |
| $U_E$ | Input voltage |
| $U_H$ | Auxiliary voltage |
| $U_{TH1}$ | First voltage threshold value |
| $U_{TH2}$ | Second voltage threshold value |
| $U_{TH3}$ | Third voltage threshold value |
| $U_{ZK}$ | Intermediate circuit voltage |

The invention claimed is:

1. A method for controlling a power source comprising a first converter for converting an input voltage to an intermediate circuit voltage, an intermediate circuit capacitor and a second converter for converting the intermediate circuit voltage to an output voltage, whereby a process is controlled at the output of the second converter, and at least one parameter or a value of the at least one parameter for controlling the intermediate circuit voltage for the first converter is predefined by a digital process controller depending on an event at the output, wherein a set value is predefined at a calculated point in time prior to the event and the intermediate circuit voltage is adapted up until the calculated point in time.

2. The method according to claim 1, wherein the at least one parameter is the intermediate circuit voltage or the set value of the at least one parameter, a switching time of the first converter, a pulse width, or a peak current for at least one switch of the first converter.

3. The method according to claim 1, wherein the intermediate circuit voltage is controlled with the aid of the first converter and an intermediate circuit voltage set value of the intermediate circuit voltage is predefined as a function of at least one of a future output voltage and a future output current.

4. The method according to claim 1, wherein an output current is impulse-shaped and the intermediate circuit voltage is increased prior to an impulse.

5. The method according to claim 4, wherein the intermediate circuit voltage is reduced when the impulse-shaped output current has reached an upper set value.

6. The method according to claim 4, wherein the intermediate circuit voltage is increased more sharply during a shorter impulse than during a longer impulse.

7. The method according to claim 4, wherein the intermediate circuit voltage is reduced when the power source is running without load.

8. A digital process controller for a power source comprising a first converter for converting an input voltage to an intermediate circuit voltage, an intermediate circuit capacitor and a second converter for converting the intermediate circuit voltage to an output voltage, comprising an input for at least one of the output voltage and the output current, an output for activating the second converter and means for running a control algorithm, where at least one of the output voltage and the output current is provided as a controlled variable and the second converter is provided as an actuator of a closed loop, and where a set value is predefined at a calculated point in time prior to the event and the intermediate circuit voltage is adapted up until the calculated point in time, and an output is provided for influencing the intermediate circuit voltage depending on a welding process or battery charging process.

9. A power source, comprising first converter for converting an input voltage to an intermediate circuit voltage, an intermediate, circuit capacitor and a second converter for converting the intermediate circuit voltage to an output voltage and a controller according to claim 8, the input of which for at least one of the output voltage and the output current is connected to the output of the power source and an output of the controller is connected to the second converter, wherein the output of the controller for influencing the intermediate circuit voltage is connected to the first converter or another controller connecting to the first converter.

10. The power source according to claim 9, wherein the first converter comprises a passive rectifier and a voltage regulator connected to the passive rectifier.

11. The power source according to claim 9, wherein the first converter comprises a controlled rectifier.

12. The power source according to claim 9, wherein the second converter comprises an inverted rectifier, a transformer connected to the inverted rectifier and a rectifier connected to the transformer.

13. The power source according to claim 9, wherein the power source is configured as a welding power source or battery charging device.

\* \* \* \* \*